United States Patent
Hanrahan et al.

(10) Patent No.: US 12,244,209 B2
(45) Date of Patent: Mar. 4, 2025

(54) AIRCRAFT POWERPLANT WITH BOOSTED GAS TURBINE ENGINE

(71) Applicant: Raytheon Technologies Corporation, Farmington, CT (US)

(72) Inventors: Paul R. Hanrahan, Sedona, AZ (US); Daniel B. Kupratis, Wallingford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/207,522

(22) Filed: Jun. 8, 2023

(65) Prior Publication Data
US 2024/0413704 A1 Dec. 12, 2024

(51) Int. Cl.
| | | |
|---|---|---|
| F02C 6/20 | (2006.01) | |
| B64D 27/10 | (2006.01) | |
| F02C 7/32 | (2006.01) | |
| F02C 7/36 | (2006.01) | |
| H02K 7/102 | (2006.01) | |
| H02K 7/116 | (2006.01) | |
| H02K 7/18 | (2006.01) | |

(52) U.S. Cl.
CPC ............ *H02K 7/102* (2013.01); *B64D 27/10* (2013.01); *F02C 7/32* (2013.01); *F02C 7/36* (2013.01); *H02K 7/116* (2013.01); *H02K 7/1823* (2013.01); *F05D 2220/323* (2013.01)

(58) Field of Classification Search
CPC .. B64D 27/10; F02C 7/32; F02C 7/36; H02K 7/116; H02K 7/1823; F05D 2220/323
See application file for complete search history.

(56) References Cited

U.S. PATENT DOCUMENTS

| | | | | |
|---|---|---|---|---|
| 5,562,190 | A * | 10/1996 | McArthur | F16D 48/066 192/82 T |
| 8,118,253 | B1 * | 2/2012 | Casado Abarquero | B64D 41/00 244/58 |
| 11,143,142 | B2 | 10/2021 | Hanrahan | |
| 11,415,044 | B2 | 8/2022 | Kupratis | |
| 11,519,337 | B2 | 12/2022 | Redford | |
| 11,639,690 | B1 | 5/2023 | Kupratis | |
| 2006/0260323 | A1 * | 11/2006 | Moulebhar | F02C 6/08 60/793 |
| 2012/0153076 | A1 | 6/2012 | Burns | |
| 2020/0040848 | A1 * | 2/2020 | Hanrahan | F02C 3/113 |
| 2020/0056497 | A1 | 2/2020 | Terwilliger | |

OTHER PUBLICATIONS

EP search report for EP24181136.3 dated Dec. 23, 2024.

\* cited by examiner

*Primary Examiner* — Sean Gugger
(74) *Attorney, Agent, or Firm* — Getz Balich LLC

(57) ABSTRACT

An aircraft system is provided that includes a first turbine engine, a second turbine engine and an electrical system. The electrical system includes a clutch, a first electric machine and a second electric machine electrically coupled to the first electric machine. The first electric machine is mechanically coupled to a first rotating assembly of the first turbine engine. The second electric machine is mechanically coupled to a second rotating assembly of the second turbine engine through the clutch.

20 Claims, 6 Drawing Sheets

AIRCRAFT POWERPLANT WITH BOOSTED GAS TURBINE ENGINE

BACKGROUND OF THE DISCLOSURE

1. Technical Field

This disclosure relates generally to an aircraft and, more particularly, to a multi-engine powerplant for the aircraft.

2. Background Information

Various types and configurations of powerplants are known in the art for an aircraft. While these known aircraft powerplants have various benefits, there is still room in the art for improvement. There is a need in the art, in particular, for an improved multi-engine aircraft powerplant.

SUMMARY OF THE DISCLOSURE

According to an aspect of the present disclosure, an aircraft system is provided that includes a first turbine engine, a second turbine engine and an electrical system. The first turbine engine includes a first rotating assembly, a first flowpath, a first compressor section, a first combustor section and a first turbine section. The first flowpath extends through the first compressor section, the first combustor section and the first turbine section from a first inlet into the first flowpath to a first exhaust from the first flowpath. The first combustor section includes a first combustor. The second turbine engine includes a second rotating assembly, a second flowpath, a second compressor section, a second combustor section and a second turbine section. The second flowpath extends through the second compressor section, the second combustor section and the second turbine section from a second inlet into the second flowpath to a second exhaust from the second flowpath. The second inlet and the second exhaust are each fluidly coupled with the first flowpath upstream of the first combustor. The electrical system includes a clutch, a first electric machine and a second electric machine electrically coupled to the first electric machine. The first electric machine is mechanically coupled to the first rotating assembly. The second electric machine is mechanically coupled to the second rotating assembly through the clutch.

According to another aspect of the present disclosure, another aircraft system is provided that includes a first turbine engine, a second turbine engine, an electrical system and an accessory system. The first turbine engine includes a propulsor rotor and an engine core configured to drive rotation of the propulsor rotor. The engine core includes a first rotating assembly and a first flowpath. The second turbine engine includes a second rotating assembly and a second flowpath. The second flowpath is fluidly coupled with the first flowpath. The electrical system includes a clutch, a first electric machine and a second electric machine electrically coupled to the first electric machine. The first electric machine is mechanically coupled to the first rotating assembly. The second electric machine is mechanically coupled to the second rotating assembly through the clutch. The accessory system includes an aircraft component and a gearbox. The gearbox mechanically couples the aircraft component to the second rotating assembly and the second electric machine.

According to still another aspect of the present disclosure, another aircraft system is provided that includes a first turbine engine, a second turbine engine, an electrical system, an accessory system and a clutch. The first turbine engine includes a propulsor rotor and an engine core configured to drive rotation of the propulsor rotor. The engine core includes a first rotating assembly and a first flowpath. The second turbine engine includes a second rotating assembly and a second flowpath. The second flowpath is fluidly coupled with the first flowpath. The electrical system includes a first electric machine and a second electric machine electrically coupled to the first electric machine. The first electric machine is mechanically coupled to the first rotating assembly. The accessory system includes an aircraft component and a gearbox. The gearbox mechanically couples the aircraft component to the second rotating assembly and the second electric machine. The clutch is coupled between the gearbox and the second rotating assembly.

The engine core may also include a first combustor. The first flowpath may extend through the first combustor. The second flowpath may be fluidly coupled with the first flowpath upstream of the first combustor.

During a mode of operation: the first rotating assembly may be configured to mechanically power the first electric machine to generate electricity; the second electric machine may be electrically powered by the electricity; and the clutch may be configured to mechanically decouple the second electric machine from the second rotating assembly.

The aircraft system may also include a gearbox and an aircraft component mechanically coupled to the gearbox. The second electric machine may be mechanically coupled to the gearbox. The second electric machine may be configured to mechanically power the aircraft component through the gearbox during the mode of operation.

During a mode of operation: the second rotating assembly may be configured to mechanically power the second electric machine through the clutch to generate electricity; and the first electric machine may be electrically powered by the electricity.

The aircraft system may also include a gearbox and an aircraft component mechanically coupled to the gearbox. The second rotating assembly may be configured to mechanically power the aircraft component through the clutch and the gearbox during the mode of operation.

The second rotating assembly may be mechanically coupled to the gearbox sequentially through the clutch and the second electric machine during the mode of operation.

The second rotating assembly may be mechanically coupled to the second electric machine sequentially through the clutch and the gearbox during the mode of operation.

During a mode of operation: the first rotating assembly may be configured to mechanically power the first electric machine to generate electricity; and the second rotating assembly may be configured to mechanically power the second electric machine through the clutch to generate additional electricity.

During a mode of operation, the first electric machine and the second electric machine may each be electrically powered by electricity.

The aircraft system may also include a gearbox and an aircraft component mechanically coupled to the second rotating assembly and the second electric machine through the gearbox.

The second rotating assembly may be mechanically coupled to the gearbox through the second electric machine.

The second rotating assembly may be mechanically coupled to the gearbox independent of the second electric machine.

The electrical system may be configured such that the clutch mechanically decouples the second electric machine from the second rotating assembly based on a temperature of a working fluid.

The electrical system may be configured to: draw more electrical power from the first electric machine than the second electric machine when a working fluid temperature is above a first threshold; and/or draw more electrical power from the second electric machine than the first electric machine when the working fluid temperature is below a second threshold.

The first turbine engine may also include a propulsor rotor and an engine core configured to drive rotation of the propulsor rotor. The engine core may include the first compressor section, the first combustor section and the first turbine section.

The propulsor rotor may be configured as or otherwise include a fan rotor.

The first turbine section may include a high pressure turbine section and a low pressure turbine section. The first rotating assembly may include a high pressure turbine rotor within the high pressure turbine section.

The second inlet may be fluidly coupled to the first flowpath at an inlet coupling. The second exhaust may be fluidly coupled to the first flowpath at an exhaust coupling. The inlet coupling may be upstream of the exhaust coupling along the first flowpath.

The second inlet may be fluidly coupled to the first flowpath downstream of the first compressor section.

The second inlet may be fluidly coupled to the first flowpath at a diffuser.

The aircraft system may also include a flow regulator configured to regulate gas flow from the first turbine engine to the second turbine engine through the second inlet.

The aircraft system may also include a flow regulator configured to regulate gas flow from the second turbine engine to the first turbine engine through the second exhaust.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
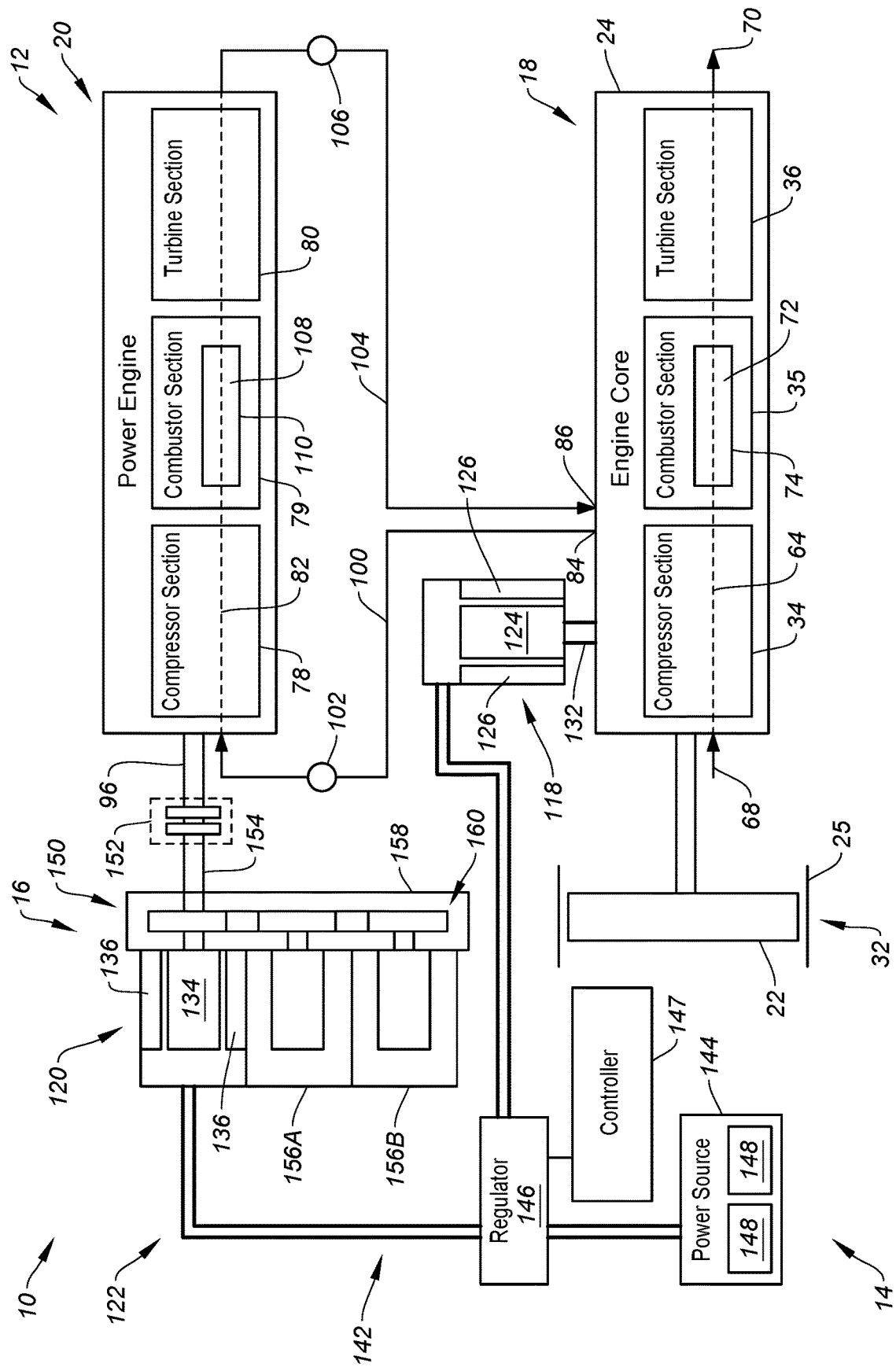
FIG. 1 is a schematic illustration of a system for an aircraft with a multi-engine powerplant.

FIG. 1 illustrates a system 10 for an aircraft. This aircraft may be an airplane, a drone (e.g., an unmanned aerial vehicle (UAV)) or any other manned or unmanned aerial vehicle or system. The aircraft system 10 of FIG. 1 includes an aircraft powerplant 12, an electrical system 14 and an aircraft accessory system 16 selectively powered by the aircraft powerplant 12 and/or the electrical system 14. The aircraft powerplant 12 of FIG. 1 includes an aircraft propulsion engine 18 and an aircraft power engine 20 fluidly coupled with the propulsion engine 18.

The propulsion engine 18 includes a propulsor rotor 22 and a gas turbine engine core 24 configured to drive rotation of the propulsor rotor 22. This propulsion engine 18 may be configured as a turbofan gas turbine engine; e.g., a high-bypass turbofan engine or a low-bypass turbofan engine. The propulsor rotor 22 of FIG. 1, for example, is configured as a ducted propulsor rotor and, more particularly, a fan rotor arranged within a fan duct 25 of the propulsion engine 18. The present disclosure, however, is not limited to such an exemplary ducted propulsor rotor configuration nor to turbofan engine applications. The propulsor rotor 22, for example, may alternatively be configured as a ducted (e.g., first stage) compressor rotor where, for example, the propulsion engine 18 is configured as a turbojet gas turbine engine. In another example, the propulsor rotor 22 may still alternatively be configured as an open (e.g., un-ducted) propulsor rotor where, for example, the propulsion engine 18 is configured as a turboprop gas turbine engine, a propfan gas turbine engine, a pusher fan gas turbine engine or any other open rotor gas turbine engine. However, for ease of description, the propulsion engine 18 and its propulsor rotor 22 may generally be described below respectively as the turbofan engine and the fan rotor.

Figure 2:
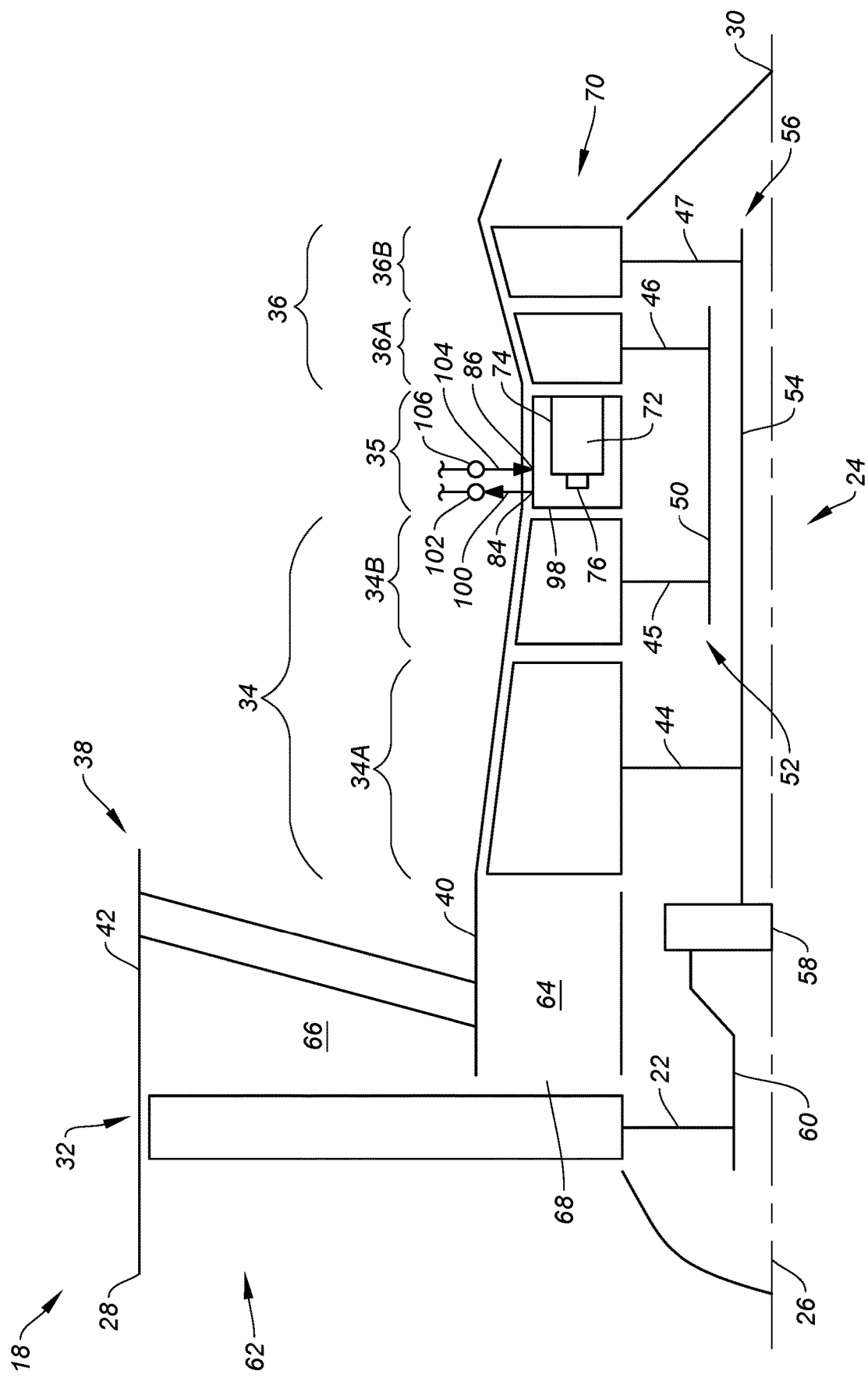
FIG. 2 is a partial schematic illustration of an aircraft propulsion engine.

Referring to FIG. 2, the propulsion engine 18 extends axially along an axial centerline 26 of the propulsion engine 18 from an upstream end 28 of the propulsion engine 18 to a downstream end 30 of the propulsion engine 18. The propulsion engine 18 includes a propulsor section 32 (e.g., a fan section) and the engine core 24. The propulsor section 32 includes the propulsor rotor 22 (e.g., the fan rotor). The engine core 24 includes a core compressor section 34, a core combustor section 35 and a core turbine section 36. The core compressor section 34 of FIG. 2 includes a low pressure compressor (LPC) section 34A and a high pressure compressor (HPC) section 34B. The core turbine section 36 of FIG. 2 includes a high pressure turbine (HPT) section 36A and a low pressure turbine (LPT) section 36B.

The propulsion engine sections 32, 34A, 34B, 35, 36A and 36B of FIG. 2 are arranged sequentially along the axial centerline 26 within an engine housing 38 of the propulsion engine 18. This engine housing 38 of FIG. 2 includes an inner case 40 (e.g., a core case) and an outer case 42 (e.g., a fan case). The inner case 40 may housing the engine core 24 and, more particularly, the LPC section 34A, the HPC section 34B, the core combustor section 35, the HPT section 36A and the LPT section 36B. The outer case 42 may house at least the propulsor section 32 and its propulsor rotor 22.

Each of the propulsion engine sections 34A, 34B, 36A and 36B includes a respective bladed rotor 44-47. Each of these propulsion engine rotors 44-47 as well as the propulsor rotor 22 includes a plurality of rotor blades arranged circumferentially around and connected to one or more respective rotor disks and/or hubs. The rotor blades, for example, may be formed integral with or mechanically fastened, welded, brazed and/or otherwise attached to the respective rotor disk(s) and/or hub(s).

The HPC rotor 45 is connected to the HPT rotor 46 through a high speed shaft 50. At least (or only) the HPC rotor 45, the HPT rotor 46 and the high speed shaft 50 may collectively form a high speed rotating assembly 52 in the propulsion engine 18 and its engine core 24. The LPC rotor 44 is connected to the LPT rotor 47 through a low speed shaft 54. At least (or only) the LPC rotor 44, the LPT rotor 47 and the low speed shaft 54 may collectively form a low speed rotating assembly 56 in the propulsion engine 18 and its engine core 24. This low speed rotating assembly 56 is coupled to (or, may also include) the propulsor rotor 22. The propulsor rotor 22 of FIG. 2, for example, is connected to a propulsor drive geartrain 58 through a propulsor shaft 60, and the LPT rotor 47 is connected to the propulsor drive geartrain 58 through the low speed shaft 54. With this arrangement, the propulsor rotor 22 may rotate at a different (e.g., slower) rotational velocity than the low speed rotating assembly 56 and its LPT rotor 47. However, in other embodiments, it is contemplated the propulsor drive geartrain 58 may be omitted to provide a direct drive coupling between the LPT rotor 47 and the propulsor rotor 22. With this arrangement, the propulsor rotor 22 and the low speed rotating assembly 56 and its LPT rotor 47 may rotate at a common (the same) rotational velocity. Referring again to FIG. 2, the engine shafts 50, 54 and 60 are rotatably supported within the engine housing 38 by a plurality of bearings. Each of these bearings is connected to the engine housing 38 by at least one stationary structure such as an annular support frame.

During operation, air enters the propulsion engine 18 through an airflow inlet 62 into the propulsion engine 18 at the engine upstream end 28. This air is directed through the propulsor section 32 and into a core flowpath 64 and a bypass flowpath 66. The core flowpath 64 extends sequentially through the LPC section 34A, the HPC section 34B, the core combustor section 35, the HPT section 36A and the LPT section 36B and, thus, the engine core 24 from an airflow inlet 68 into the core flowpath 64 to a combustion products exhaust 70 from the propulsion engine 18 and its core flowpath 64 at the engine downstream end 30. The air within the core flowpath 64 may be referred to as "propulsion engine core air". The bypass flowpath 66 extends through a bypass duct, which bypass duct is radially outboard of and bypasses the engine core 24. The air within the bypass flowpath 66 may be referred to as "bypass air".

The propulsion engine core air is compressed by the LPC rotor 44 and the HPC rotor 45 and directed into a core combustion chamber 72 (e.g., an annular combustion chamber) of a core combustor 74 (e.g., annular combustor) in the core combustor section 35. Fuel is injected into the core combustion chamber 72 via one or more fuel injectors 76 and mixed with the compressed propulsion engine core air to provide a fuel-air mixture. This fuel-air mixture is ignited and combustion products thereof flow through and sequentially cause the HPT rotor 46 and the LPT rotor 47 to rotate. The rotation of the HPT rotor 46 and the LPT rotor 47 respectively drive rotation of the HPC rotor 45 and the LPC rotor 44 and, thus, compression of the air received from the core inlet 68. The rotation of the LPT rotor 47 also drives rotation of the propulsor rotor 22. Rotation of the propulsor rotor 22 propels the bypass air through and out of the bypass flowpath 66 to provide (e.g., forward) aircraft thrust. The propulsion of the bypass air may account for a majority of thrust generated by the propulsion engine 18.

Figure 3:
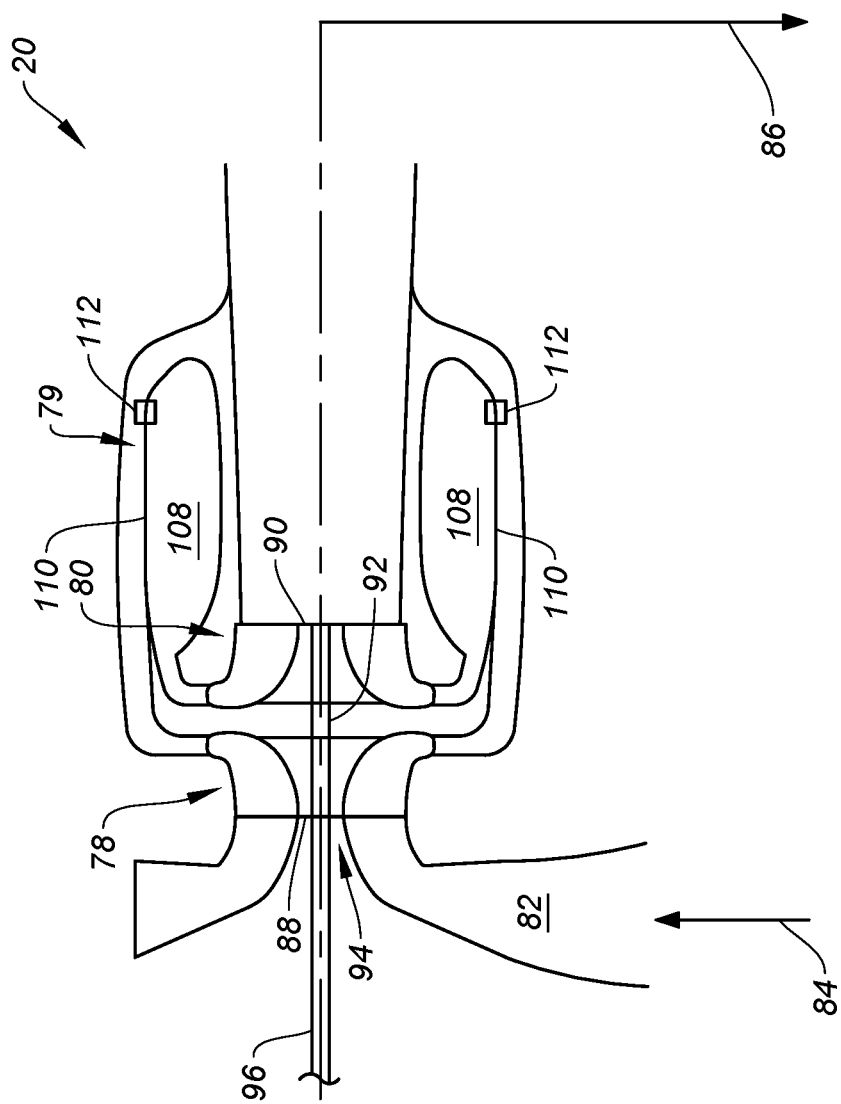
FIG. 3 is a partial schematic illustration of an aircraft power engine.

Referring to FIG. 3, the power engine 20 may be configured as an auxiliary power unit (APU) for the aircraft. The power engine 20 of FIG. 3 includes a power engine compressor section 78, a power engine combustor section 79, a power engine turbine section 80 and a power engine flowpath 82; e.g., a core flowpath within the power engine 20. The engine flowpath 82 extends sequentially through the engine compressor section 78, the engine combustor section 79 and the engine turbine section 80 from an airflow inlet 84 into the power engine 20 and its engine flowpath 82 to a combustion products exhaust 86 from the power engine 20 and its engine flowpath 82.

The engine compressor section 78 and the engine turbine section 80 each include a respective bladed rotor 88 and 90. Each of these power engine rotors 88 and 90 includes a plurality of rotor blades (e.g., impeller vanes) arranged circumferentially around and connected to one or more respective rotor disks and/or hubs. The rotor blades, for example, may be formed integral with or mechanically fastened, welded, brazed and/or otherwise attached to the respective rotor disk(s) and/or hub(s).

The compressor rotor 88 is connected to and rotatably driven by the turbine rotor 90 through a power engine shaft 92. At least (or only) the compressor rotor 88, the turbine rotor 90 and the engine shaft 92 may collectively form a power engine rotating assembly 94 within the power engine 20. This engine rotating assembly 94 is coupled to (or, may also include) an engine mechanical drive 96; e.g., a drive shaft, a drive coupling, etc.

Referring to FIGS. 1 and 2, the engine inlet 84 is fluidly coupled with the propulsion engine 18 and its core flowpath 64. This engine inlet 84 is configured to receive (e.g., bleed) the propulsion engine core air from the core flowpath 64, for example upstream of the core combustor 74. The engine inlet 84 of FIG. 2, for example, is formed by and/or in a component (e.g., a case, vane arrangement, etc.) of the propulsion engine 18. The engine inlet 84 may be located in/along the core compressor section 34 and, more particularly, the HPC section 34B. Alternatively, the engine inlet 84 may be located in/along the core combustor section 35. The engine inlet 84 of FIG. 2, for example, is located at (e.g., on, adjacent or proximate) a diffuser 98 between the HPC section 34B and a plenum surrounding the core combustor 74. Referring to FIG. 1, the engine inlet 84 is fluidly coupled to the engine compressor section 78 through an inlet duct 100. This inlet duct 100 (or the engine inlet 84) may be configured with a flow regulator 102 (e.g., a valve) for regulating the flow of the propulsion engine core air diverted out of the core flowpath 64 to the power engine 20.

Referring to FIGS. 1 and 2, the engine exhaust 86 is fluidly coupled with the propulsion engine 18 and its core flowpath 64. This engine exhaust 86 is configured to direct exhaust (e.g., combustion products) from the power engine 20 into the core flowpath 64, for example upstream of the core combustor 74 and/or downstream of the engine inlet 84. The engine exhaust 86 of FIG. 2, for example, is formed by and/or in another component (e.g., a case, vane arrangement, etc.) of the propulsion engine 18. The engine exhaust 86 may be located in/along the core combustor section 35. The engine exhaust 86 of FIG. 2, for example, is located at (e.g., on, adjacent or proximate) the diffuser 98. Referring to FIG. 1, the engine exhaust 86 is fluidly coupled to the engine turbine section 80 through an exhaust duct 104. This exhaust duct 104 (or the engine exhaust 86) may be configured with a flow regulator 106 (e.g., a valve) for regulating the flow of the gas exhausted from the power engine 20 and directed into the propulsion engine 18.

During operation of the power engine 20 of FIGS. 1 and 3, the propulsion engine core air bled from the core flowpath 64 enters the power engine 20 through the engine inlet 84 and the inlet duct 100. This air is directed into the engine flowpath 82. The air within the engine flowpath 82 may be referred to as "power engine core air".

The power engine core air is compressed by the compressor rotor 88 and directed into a power engine combustion chamber 108 (e.g., an annular combustion chamber) of a power engine combustor 110 (e.g., annular combustor) in the engine combustor section 79. Fuel is injected into the engine combustion chamber 108 via one or more fuel injectors 112 and mixed with the compressed power engine core air to provide a fuel-air mixture. This fuel-air mixture is ignited and combustion products thereof flow through and cause the turbine rotor 90 to rotate. The rotation of the turbine rotor 90 drives rotation of the compressor rotor 88 and, thus, compression of the power engine core air received from the engine inlet 84. The rotation of the turbine rotor 90 also drives rotation of the engine mechanical drive 96.

Figure 4:
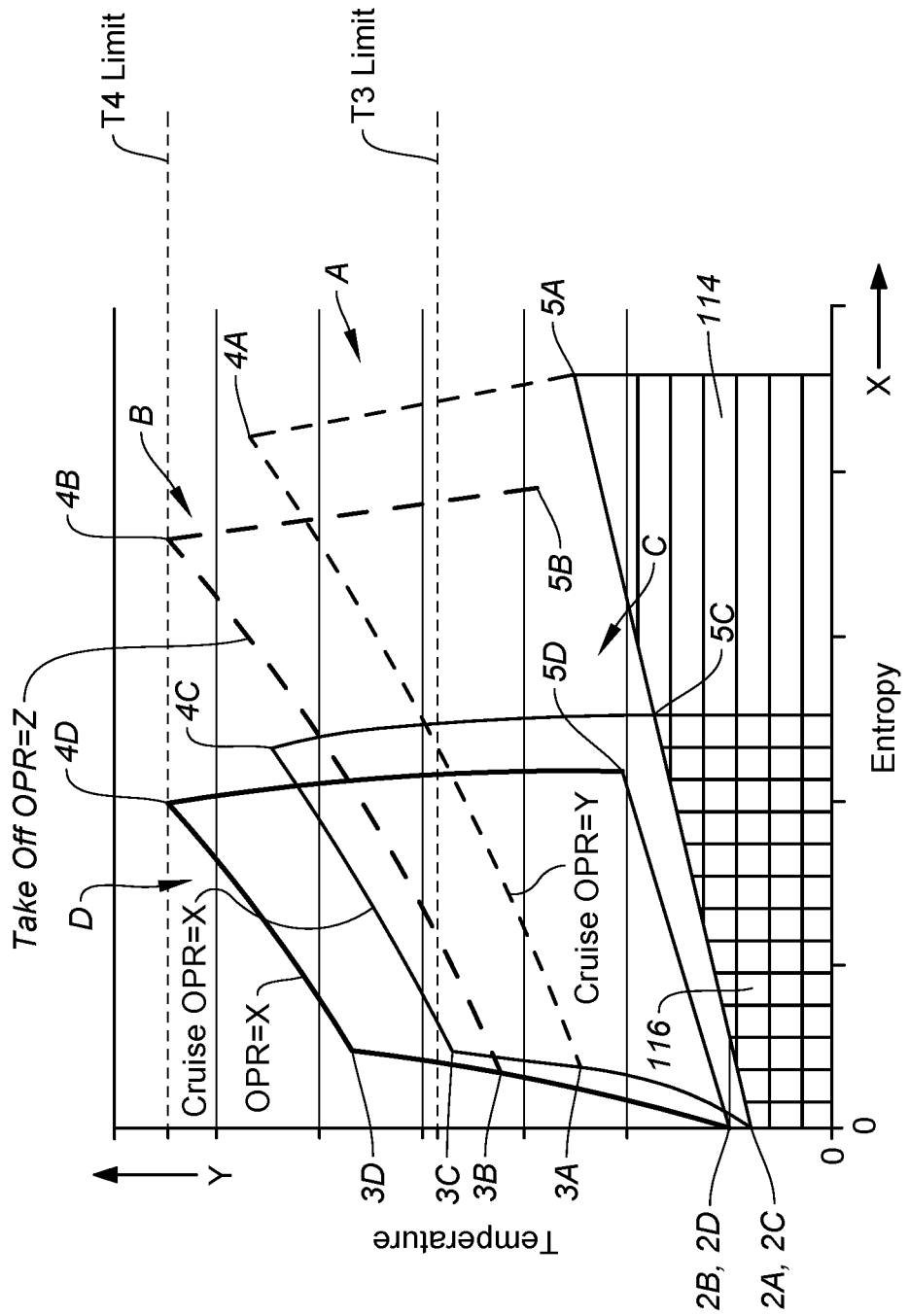
FIG. 4 is a T-s diagram illustrating thermodynamic performance of the aircraft propulsion engine boosted by the aircraft power engine relative to the aircraft propulsion engine operated without the aircraft power engine.

FIG. 4 is a T-s diagram illustrating thermodynamic performance of the propulsion engine 18 of FIGS. 1 and 2 boosted by the power engine 20 of FIGS. 1 and 3 (a boosted gas turbine engine arrangement) relative to the propulsion engine 18 operated without being boosted by the power engine 20 (an un-boosted gas turbine engine arrangement). Entropy is plotted along an x-axis, and temperature is plotted along a y-axis. Dashed curve A depicts a thermodynamic cycle of the un-boosted propulsion engine 18 operating at cruise power. Dashed curve B depicts a thermodynamic cycle of the un-boosted propulsion engine 18 operating at takeoff power on a hot day. Solid curve C depicts the boosted propulsion engine 18 operating with the power engine 20 at cruise power. Solid curve D depicts another gas turbine engine operating at takeoff power on a hot day having an overall pressure ratio (OPR) (value=X) that is equal to an overall pressure ratio of the boosted propulsion engine 18 operating at cruise power.

Each of the curves A, B, C and D is defined by points 2, 3, 4, and 5, respectively. The dashed curve A extends from point 2A to point 3A, representing compression work completed by the un-boosted propulsion engine 18 between an inlet and an exit of the core compressor section 34. From point 3A, the dashed curve A extends along a line of constant pressure ratio (value=Y) to point 4A that represents heat added to a core airflow through combustion. After combustion, the HPT section 36A and the LPT section 36B extract work from the heated and compressed core flow, a process represented by dashed line A between points 4A and 5A. The dashed curve B extends between point 2B to point 3B during the compression phase, between point 3B and 4B along a line of constant pressure ratio (value=Z) during combustion, and between point 4B and 5B during turbine expansion. The solid curves C and D are defined by points 2C, 3C, 4C, and 5C and points 2D, 3D, 4D, and 5D in a similar manner to the curves A and B. An engine operating along the curve A has less overall pressure ratio (value Y) than an engine operating on any of the other curves; e.g., curves C and D have an overall pressure ratio equal to value X and the curve B has an overall pressure ratio value equal to Z. An engine operating on the curves C and D also have an overall pressure ratio value X that is greater than an engine operating on curve B with an overall pressure ratio value Z.

The temperature entering the core compressor section 34 of the propulsion engine 18 at cruise power is lower than the temperature entering the core compressor section 34 of the propulsion engine 18 at takeoff power because the ambient temperature at cruising altitude is lower than the ambient temperature during a hot day takeoff. For example, the ambient temperature may be approximately −26.1 degrees Celsius (e.g., about −15 degrees fahrenheit) at cruise altitude, while the ambient temperature may be approximately 46.1 degrees Celsius (e.g., about 115 degrees fahrenheit) on a hot day takeoff. For each curve, the temperature within the engine at points 3A, 3B, 3C, and 3D are limited to a line of constant temperature labeled "T3 Limit" while the temperature at points 4A, 4B, 4C, and 4D are limited to a line of constant temperature labeled "T4 Limit".

The un-boosted operation of the propulsion engine 18 represented by dashed curves A and B provides a compromise between temperature limits during a hot day takeoff and cruise. The overall pressure ratio of the un-boosted propulsion engine 18 may thereby be limited by hot day takeoff conditions; e.g., the temperature at point 4B may be limited by the T3 Limit. The area bounded by the dashed curve A and a line connecting points 5A and 2A represent the amount of work completed by the propulsion engine 18 while operating at cruise power and without operating the power engine 20. The amount of heat energy rejected by the propulsion engine 18 while operating in accordance with dashed curve A is shown by horizontally-hatched area 114. The thermodynamic efficiency of the propulsion engine 18 operating in accordance with the dashed curve A is the work energy divided by the summation of work and rejected heat energy defined by the dashed curve A.

Figure 5:
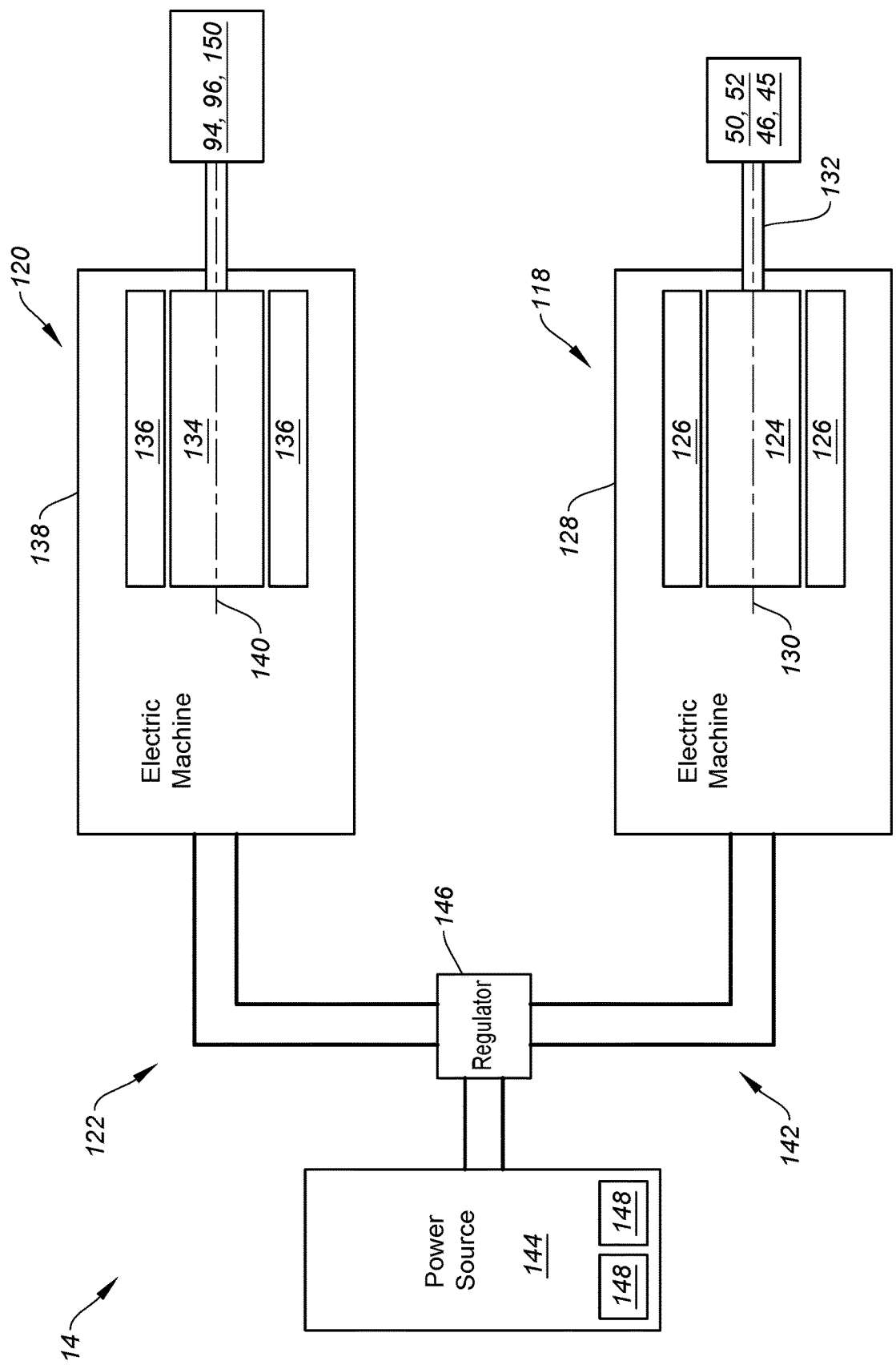
FIG. 5 is a schematic illustration of an electrical system coupled to various other components of the aircraft system.

The work performed by the propulsion engine 18 while the power engine 20 is operating is bounded by the curve C and a line extending between points 5C and 2C while the heat energy rejected by the boosted propulsion engine 18 operating at cruise power is shown by vertically-hatched area 116. Regions where areas 114 and 116 overlap appear as a square-hatched area. By comparing work areas bounded by the curves A and C relative to the heat rejection areas 114 and 116, respectively, it is evident that the work area C represents a larger percentage of the total area under the curve C than corresponding areas under the curve A. Accordingly, operating the propulsion engine 18 with the power engine 20 at cruise power results in more efficient thermodynamic operation and, thus, improved thrust specific fuel consumption (TSFC) than operating the propulsion engine 18 without the power engine 20. Furthermore, a gas turbine engine with the same overall pressure ratio as the boosted propulsion engine 18 operation depicted by the curve D may not satisfy thermal limits at points 3D and 4D as shown in FIG. 5; e.g., the temperature at 3D exceeds the T3 Limit, and the temperature at 4D exceeds the T4 limit. The propulsion engine 18 may thereby be operated without the power engine 20 during hot day takeoff conditions (e.g., the dashed curve B) and may be operated with the power engine 20 at cruise power (e.g., the solid curve C) to achieve greater thermal efficiency at cruise power while satisfying thermal limits for hot day takeoff conditions. Of course, the power engine 20 may also or alternatively be operated when needed to provide electrical power to the accessory system 16 as described below.

Referring to FIG. 5, the electrical system 14 includes one or more electric machines 118 and 120 and an electricity distribution system 122. Referring to FIG. 1, one of these electric machines (e.g., 118) is associated with the propulsion engine 18 and its engine core 24, and may therefore be referred to below as a core electric machine. Another one of the electric machines (e.g., 120) is associated with the power engine 20, and may thereby be referred to as a power engine electric machine. The electric machines 118 and 120 of FIG. 1 are disposed outside of the respective gas turbine engines 18 and 20. The present disclosure, however, is not limited to such an exemplary embodiment. The core electric machine 118, for example, may alternatively be integrated into the propulsion engine 18 and its engine core 24.

Referring to FIG. 5, the core electric machine 118 includes a core electric machine rotor 124 ("core machine rotor"), a core electric machine stator 126 ("core machine stator") and a core electric machine housing 128 ("core machine housing"). The core machine rotor 124 is rotatable about a rotational axis 130 of the core machine rotor 124, which rotational axis 130 may also be an axial centerline of the core electric machine 118. This core machine rotor 124 is configured to drive rotation of and/or be rotationally driven by the propulsion engine 18 and its engine core 24 (see FIG. 1). The core machine rotor 124 of FIG. 5, for example, is coupled to and rotatable with the high speed rotating assembly 52 through a core electric machine drivetrain 132 ("core machine drivetrain"); e.g., a tower shaft assembly. The core machine stator 126 of FIG. 5 is radially outboard of and circumscribes the core machine rotor 124. With this arrangement, the core electric machine 118 is configured as a radial flux electric machine. The core electric machine 118 of the present disclosure, however, is not limited to such an exemplary rotor-stator configuration nor to radial flux arrangements. The core machine rotor 124, for example, may alternatively be radially outboard of and circumscribe the core machine stator 126. In another example, the core machine rotor 124 may be axially next to the core machine stator 126 configuring the core electric machine 118 as an axial flux electric machine. Referring again to FIG. 5, the core machine rotor 124 and the core machine stator 126 are at least partially or completely housed within the core machine housing 128.

The core electric machine 118 of FIG. 5 may be configurable as an electric generator and/or an electric motor. For example, during a generator mode of operation, the core electric machine 118 may operate as the electric generator to convert mechanical power received from, for example, the high speed rotating assembly 52 and its HPT rotor 46 into electricity. The high speed rotating assembly 52 and its HPT rotor 46, for example, may drive rotation of the core machine rotor 124 through the core machine drivetrain 132. The rotation of the core machine rotor 124 may generate an electromagnetic field with the core machine stator 126, and the core machine stator 126 may convert energy from the electromagnetic field into the electricity. The core electric machine 118 may then provide this electricity to the electricity distribution system 122 for further use. During a motor mode of operation, the core electric machine 118 may operate as the electric motor to convert electricity received from the electricity distribution system 122 into mechanical power. The core machine stator 126, for example, may generate an electromagnetic field with the core machine rotor 124 using the electricity. This electromagnetic field may drive rotation of the core machine rotor 124. The core machine rotor 124 may thereby drive rotation of the high speed rotating assembly 52 and its HPC rotor 45 through the core machine drivetrain 132. This mechanical power may be provided to the high speed rotating assembly 52 to boost power or completely power rotation of the HPC rotor 45 (see FIG. 2). Of course, in other embodiments, the core electric machine 118 may alternatively be configured as a dedicated electric generator (e.g., without the electric motor functionality), or as a dedicated electric motor (e.g., without the electric generator functionality).

Referring still to FIG. 5, the engine electric machine 120 includes a power engine electric machine rotor 134 ("engine machine rotor"), a power engine electric machine stator 136 ("engine machine stator") and a power engine electric machine housing 138 ("engine machine housing"). The engine machine rotor 134 is rotatable about a rotational axis 140 of the engine machine rotor 134, which rotational axis 140 may also be an axial centerline of the engine electric machine 120. This engine machine rotor 134 is configured to drive rotation of and/or be rotationally driven by the power engine 20 (see FIG. 1). The engine machine rotor 134 of FIG. 5, for example, is selectively coupled to and rotatable with the engine rotating assembly 94 through the accessory system 16 (see FIG. 1) as described below in further detail. The engine machine stator 136 of FIG. 5 is radially outboard of and circumscribes the engine machine rotor 134. With this arrangement, the engine electric machine 120 is configured as a radial flux electric machine. The engine electric machine 120 of the present disclosure, however, is not limited to such an exemplary rotor-stator configuration nor to radial flux arrangements. The engine machine rotor 134, for example, may alternatively be radially outboard of and circumscribe the engine machine stator 136. In another example, the engine machine rotor 134 may be axially next to the engine machine stator 136 configuring the engine electric machine 120 as an axial flux electric machine. Referring again to FIG. 5, the engine machine rotor 134 and the engine machine stator 136 are at least partially or completely housed within the engine machine housing 138.

The engine electric machine 120 of FIG. 5 may be configurable as an electric generator and/or an electric motor. For example, during a generator mode of operation, the engine electric machine 120 may operate as the electric generator to convert mechanical power received from, for example, the engine rotating assembly 94 into electricity. The engine rotating assembly 94, for example, may drive rotation of the engine machine rotor 134 through the accessory system 16 (see FIG. 1). The rotation of the engine machine rotor 134 may generate an electromagnetic field with the engine machine stator 136, and the engine machine stator 136 may convert energy from the electromagnetic field into the electricity. The engine electric machine 120 may then provide this electricity to the electricity distribution system 122 for further use. During a motor mode of operation, the engine electric machine 120 may operate as the electric motor to convert electricity received from the electricity distribution system 122 into mechanical power. The engine machine stator 136, for example, may generate an electromagnetic field with the engine machine rotor 134 using the electricity. This electromagnetic field may drive rotation of the engine machine rotor 134. The engine machine rotor 134 may thereby drive rotation of the engine rotating assembly 94 through the accessory system 16 (see FIG. 1) and/or other components of the accessory system 16. Of course, in other embodiments, the engine electric machine 120 may alternatively be configured as a dedicated electric generator (e.g., without the electric motor functionality), or as a dedicated electric motor (e.g., without the electric generator functionality).

The electricity distribution system 122 of FIG. 5 includes an electricity bus 142 and a power source 144. The electricity distribution system 122 may also include an electricity regulator 146 (e.g., one or more switches) and a controller 147 (see FIG. 1). The electricity bus 142 is electrically coupled to the core electric machine 118 and its core machine stator 126, the engine electric machine 120 and its engine machine stator 136 and the power source 144. This electricity bus 142 may be configured as or otherwise include one or more high voltage electric lines. The power source 144 is configured to store electricity received from one or more of the electric machines 118 and 120 through the electricity bus 142. The power source 144 is also configured to provide the stored electricity to one or more of the electric machines 118 and 120 through the electricity bus 142. The power source 144, for example, may be configured as or otherwise include one or more batteries 148 (or battery stacks) and/or one or more other power storage devices. The electricity regulator 146 is configured to regulate the flow of electricity across the electricity bus 142. The electricity regulator 146, for example, may direct electricity from the power source 144 to one or both the electric machines 118 and 120. In another example, the electricity regulator 146 may direct electricity generated by one or both of the electric machines 118 and 120 to the power source 144 for storage, and/or to other electrically powered aircraft systems. In still another example, the electricity regulator 146 may direct electricity generated by one of the electric machines 118, 120 to the other electric machine 120, 118 and/or the power source 144. With the foregoing arrangement, the electric system of FIG. 5 may facilitate power transfer between the propulsion engine 18 and the power engine 20.

The controller 147 of FIG. 1 is in signal communication (e.g., hardwired and/or wirelessly coupled) with the electricity regulator 146 and various other components. The controller 147 may be configured as an onboard engine controller or discrete from the onboard engine controller. The controller 147 may be implemented with a combination of hardware and software. The hardware may include memory and at least one processing unit, which processing unit may include one or more single-core and/or multi-core processors. The hardware may also or alternatively include analog and/or digital circuitry other than that described above.

The memory is configured to store software (e.g., program instructions) for execution by the processing unit, which software execution may control and/or facilitate performance of one or more operations such as those described below. The memory may be a non-transitory computer readable medium. For example, the memory may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The accessory system 16 includes a gearbox 150 (e.g., accessory gearbox), a clutch 152 and a gearbox mechanical drive 154; e.g., a drive shaft, a drive coupling, etc. The accessory system 16 of FIG. 1 also includes one or more other components 156A and 156B (generally referred to as "156") of the aircraft; e.g., aircraft accessories. One or more of the aircraft components 156 may each be configured as an accessory for one or more of the gas turbine engines 18 and 20. One or more of the aircraft components 156 may also or alternatively each be configured as an accessory for other aircraft systems; e.g., aircraft cabin systems, aircraft flight control systems, etc. Examples of the aircraft components 156 include, but are not limited to, a fluid pump (e.g., a fuel pump, a lubricant pump, a coolant pump and/or an actuation (e.g., hydraulic) fluid pump), an auxiliary air compressor (e.g., a compressor for a cabin environmental system), another electrical generator, and the like.

The gearbox 150 of FIG. 1 includes a gearbox housing 158 and a gearbox geartrain 160 housed within the gearbox housing 158. The gearbox 150 and its gearbox housing 158 of FIG. 1 are disposed outside of the gas turbine engines 18 and 20; however, the present disclosure is not limited to such an exemplary arrangement. The gearbox geartrain 160 of FIG. 1 includes a plurality of gears (e.g., drive gears and/or idler gears) meshed together within the gearbox housing 158. This gearbox geartrain 160 and its gears are configured to mechanically couple the aircraft system members 20, 120 and 156 together. The engine machine rotor 134 of FIG. 1, for example, is mechanically coupled to the gearbox geartrain 160 and one of its gears; e.g., a drive gear. A rotor of/within each aircraft component 156 of FIG. 1 is similarly mechanically coupled to the gearbox geartrain 160 and one of its gears; e.g., a drive gear. Here, each of the aircraft system members 120 and 156 may be mounted to the gearbox 150 and its gearbox housing 158. By contrast, the clutch 152 is arranged between the gearbox 150 and the power engine 20. The clutch 152 of FIG. 1, for example, is arranged between and mechanically coupled to the engine mechanical drive 96 and the gearbox mechanical drive 154. The gearbox mechanical drive 154 mechanically couples the clutch 152 to the gearbox geartrain 160 and one of its gears; e.g., a drive gear. With this arrangement, the clutch 152 mechanically couples the power engine 20 and its engine rotating assembly 94 (see FIG. 3) to the gearbox geartrain 160 when the clutch 152 is engaged; e.g., closed. However, the clutch 152 mechanically decouples the power engine 20 and its engine rotating assembly 94 (see FIG. 3) from the gearbox geartrain 160 when the clutch 152 is disengaged; e.g., open. The clutch 152 may thereby be actuated to selectively couple and decouple the power engine 20 and its engine rotating assembly 94 (see FIG. 3) from the rest of the accessory system 16 as well as the electrical system 14.

Referring to FIGS. 1-3 and 5, during a mode of operation to boost power to the high speed rotating assembly 52 ("propulsion engine boost mode"), the electrical system 14 may extract power from the power engine 20 and its engine rotating assembly 94 and provide at least some or all of that extracted power to the propulsion engine 18 and its high speed rotating assembly 52. The engine electric machine 120, for example, may operate as the electric generator which is rotationally driven by the power engine 20 and its engine rotating assembly 94. The electricity regulator 146 may direct at least some or all of the electricity generated by the engine electric machine 120 to the core electric machine 118. The core electric machine 118 may operate as the electric motor to drive rotation of the high speed rotating assembly 52. Power generated using the HPT rotor 46 may thereby be boosted with power generated by the engine rotating assembly 94 and its turbine rotor 90 through the electrical system 14.

During a mode of operation to boost power to the engine rotating assembly 94 ("power engine boost mode"), the electrical system 14 may extract power from the propulsion engine 18 and its high speed rotating assembly 52 and provide at least some or all of that extracted power to the power engine 20 and its engine rotating assembly 94. The core electric machine 118, for example, may operate as the electric generator which is rotationally driven by the propulsion engine 18 and its high speed rotating assembly 52. The electricity regulator 146 may direct at least some or all of the electricity generated by the core electric machine 118 to the engine electric machine 120. The engine electric machine 120 may operate as the electric motor to drive rotation of the engine rotating assembly 94. Power generated using the turbine rotor 90 may thereby be boosted with power generated by the high speed rotating assembly 52 and its HPT rotor 46 through the electrical system 14.

A total amount of mechanical and electric power utilized from each of the propulsion engine 18 and the power engine 20 goes up when the respective electric machine 118, 120 coupled to the engine 18, 20 operates as a generator, and goes down when the respective electric machine 118, 120 operates as a motor. The nominal power of the propulsion engine 18 may be significantly higher than the nominal power of the power engine 20. The change in power to each engine 18, 20 on a percentage basis due to changing electric machine output may thereby be lower for the propulsion engine 18, and higher for the power engine 20. Raising or lowering power may also raise or lower pressure ratio. Because of the larger effect on the power engine 20, generating more power with the power electric machine 120 and less power with the core electric machine 118 may raise the overall pressure ratio (OPR). Conversely, generating less power with power electric machine 120 and more power with the engine electric machine 118 may reduce the overall pressure ratio.

In some embodiments, operation of the power electric machine 120 and the core electric machine 118 may be controlled using the controller 147 based on a temperature of a working fluid. This working fluid may be the ambient air entering the propulsion engine 18 through its airflow inlet 62. Alternatively, the working fluid may be the propulsion engine core air at one or more points along the core flowpath 64. When the working fluid temperature is determined (e.g., measured, calculated or estimated) to be higher than a threshold for example, electric power demand may be preferentially drawn more from the core electric machine 118 and less from the power electric machine 120. When the working fluid temperature is less than another threshold for example, electric power demand may be preferentially drawn more from the power electric machine 120 and less from the core electric machine 118.

During a mode of operation to boost power to both rotating assemblies 52 and 94 ("full boost mode"), the electrical system 14 may use power stored in the power source 144 to provide power to the propulsion engine 18 and its high speed rotating assembly 52 as well as to the power engine 20 and its engine rotating assembly 94. The electricity regulator 146, for example, may direct electricity from the power source 144 selectively (e.g., evenly or unevenly) to the core electric machine 118 and the engine electric machine 120. The core electric machine 118 may operate as the electric motor to drive rotation of the high speed rotating assembly 52. Power generated using the HPT rotor 46 may thereby be boosted with the power stored within the power source 144 through the electrical system 14. Similarly, the engine electric machine 120 may operate as the electric motor to drive rotation of the engine rotating assembly 94. Power generated using the turbine rotor 90 may thereby be boosted with the power stored within the power source 144 through the electrical system 14.

During a power storage mode of operation, the electrical system 14 may extract power from both the propulsion engine 18 and its high speed rotating assembly 52 as well as the power engine 20 and its low speed rotating assembly 56, and provide that extracted power to the power source 144 for storage (and/or to one or more other electrically powered aircraft systems and/or components). The core electric machine 118, for example, may operate as the electric generator which is rotationally driven by the high speed rotating assembly 52. The electricity regulator 146 may direct at least some or all of the electricity generated by the core electric machine 118 to the power source 144 (or otherwise). Similarly, the engine electric machine 120 may operate as the electric generator which is rotationally driven by the engine rotating assembly 94. The electricity regulator 146 may direct at least some or all of the electricity generated by the engine electric machine 120 to the power source 144 (or otherwise).

During the foregoing modes of operation, the clutch 152 is engaged and mechanically couples the power engine 20 and its engine rotating assembly 94 to the gearbox geartrain 160 and, thus, the engine machine rotor 134. During other modes of operation, however, it may be beneficial to disengage the power engine 20 and its engine rotating assembly 94 from the accessory system 16 and the electrical system 14. For example, when air entering the propulsion engine 18 and, thus, the core flowpath 64 is relatively hot, the power engine 20 may be turned off (and/or fluidly decoupled from the core flowpath 64) so as to maintain a temperature of the propulsion engine core air below a (variable or constant) threshold. During such operation, the core electric machine 118 may be operated as the electric generator and the engine electric machine 120 may be operated as the electric motor. The engine electric machine 120 may therefore run off of electricity provided by the core electric machine 118 (and/or the power source 144) to mechanically power operation of one or more of the aircraft components 156. The aircraft component(s) 156 may thereby continue to operate (e.g., uninterrupted) even when the power engine 20 is non-operational and/or mechanically decoupled from the gearbox 150 via the clutch 152. Of course, it is also contemplated the engine electric machine 120 may alternatively be powered (e.g., solely) by the power source 144 and the core electric machine 118 may continue to operate as the electric motor (or may be turned off) during select modes of operation, including transitions to when the power engine 20 is initially decoupled and/or turned off.

In some embodiments, operation of the power engine 20 and/or the clutch 152 may be controlled based on a temperature of a working fluid. This working fluid may be the ambient air entering the propulsion engine 18 through its airflow inlet 62. Alternatively, the working fluid may be the propulsion engine core air at one or more points along the core flowpath 64. When the working fluid temperature is determined (e.g., measured, calculated or estimated) to be equal to or has risen above a (variable or constant) threshold, the power engine 20 may be turned off (or otherwise depowered) and/or the clutch 152 may be disengaged (e.g., opened). However, when the working fluid temperature is determined (e.g., measured, calculated or estimated) to have fallen back below the (variable or constant) threshold, the power engine 20 may be turned on (or otherwise powered-up) and/or the clutch 152 may be engaged (e.g., closed).

Figure 6:
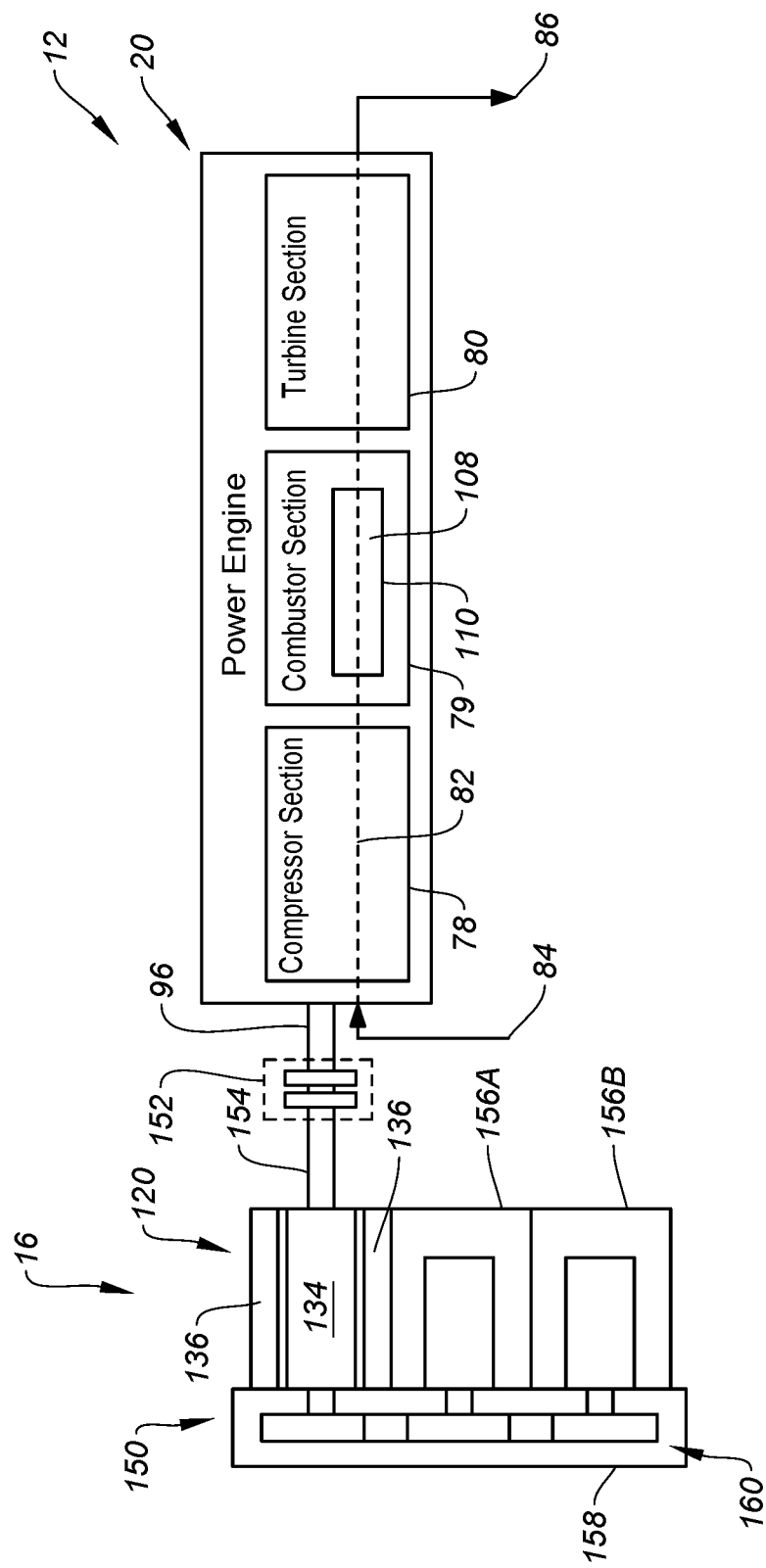
FIG. 6 is a partial schematic illustration of the aircraft system with another gearbox-electric machine arrangement.

In some embodiments, referring to FIG. 1, the gearbox 150 and its gearbox geartrain 160 may be configured to mechanically couple the engine electric machine 120 and its engine machine rotor 134 to the power engine 20 and its engine rotating assembly 94. In other embodiments however, referring to FIG. 6, the engine electric machine 120 and its engine machine rotor 134 may be mechanically coupled between the clutch 152 and the gearbox 150 and its gearbox geartrain 160. The power engine 20 and its engine rotating assembly 94 may thereby mechanically power the aircraft component(s) 156 through the engine electric machine 120. The present disclosure, however, is not limited to the foregoing exemplary arrangements.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An aircraft system, comprising:
a first turbine engine including a first rotating assembly, a first flowpath, a first compressor section, a first combustor section and a first turbine section, the first flowpath extending through the first compressor section, the first combustor section and the first turbine section from a first inlet into the first flowpath to a first exhaust from the first flowpath, and the first combustor section comprising a first combustor;
a second turbine engine including a second rotating assembly, a second flowpath, a second compressor section, a second combustor section and a second turbine section, the second flowpath extending through the second compressor section, the second combustor section and the second turbine section from a second inlet into the second flowpath to a second exhaust from the second flowpath, and the second inlet and the second exhaust each fluidly coupled with the first flowpath upstream of the first combustor; and
an electrical system including a clutch, a first electric machine and a second electric machine electrically coupled to the first electric machine, the first electric machine mechanically coupled to the first rotating assembly, and the second electric machine mechanically coupled to the second rotating assembly through the clutch;
wherein the electrical system is configured to draw more electrical power from the second electric machine than the first electric machine when a working fluid temperature is below a first threshold.

2. The aircraft system of claim 1, wherein, during a mode of operation,
the first rotating assembly is configured to mechanically power the first electric machine to generate electricity;
the second electric machine is electrically powered by the electricity; and
the clutch is configured to mechanically decouple the second electric machine from the second rotating assembly.

3. The aircraft system of claim 2, further comprising:
a gearbox; and
an aircraft component mechanically coupled to the gearbox;
the second electric machine mechanically coupled to the gearbox, and the second electric machine configured to mechanically power the aircraft component through the gearbox during the mode of operation.

4. The aircraft system of claim 1, wherein, during a mode of operation,
the second rotating assembly is configured to mechanically power the second electric machine through the clutch to generate electricity; and
the first electric machine is electrically powered by the electricity.

5. The aircraft system of claim 4, further comprising:
a gearbox; and
an aircraft component mechanically coupled to the gearbox;
the second rotating assembly configured to mechanically power the aircraft component through the clutch and the gearbox during the mode of operation.

6. The aircraft system of claim 1, further comprising:
a gearbox; and
an aircraft component mechanically coupled to the second rotating assembly and the second electric machine through the gearbox.

7. The aircraft system of claim 6, wherein the second rotating assembly is mechanically coupled to the gearbox through the second electric machine.

8. The aircraft system of claim 6, wherein the second rotating assembly is mechanically coupled to the gearbox independent of the second electric machine.

9. The aircraft system of claim 1, wherein the electrical system is configured such that the clutch mechanically decouples the second electric machine from the second rotating assembly based on a temperature of a working fluid.

10. The aircraft system of claim 1, wherein the electrical system is further configured to draw more electrical power from the first electric machine than the second electric machine when the working fluid temperature is above a second threshold.

11. The aircraft system of claim 1, wherein
the first turbine engine further includes a propulsor rotor and an engine core configured to drive rotation of the propulsor rotor; and
the engine core includes the first compressor section, the first combustor section and the first turbine section.

12. The aircraft system of claim 11, wherein the propulsor rotor comprises a fan rotor.

13. The aircraft system of claim 1, wherein
the first turbine section includes a high pressure turbine section and a low pressure turbine section; and
the first rotating assembly includes a high pressure turbine rotor within the high pressure turbine section.

14. The aircraft system of claim 1, wherein
the second inlet is fluidly coupled to the first flowpath at an inlet coupling;
the second exhaust is fluidly coupled to the first flowpath at an exhaust coupling; and
the inlet coupling is upstream of the exhaust coupling along the first flowpath.

15. The aircraft system of claim 1, wherein the second inlet is fluidly coupled to the first flowpath downstream of the first compressor section.

16. The aircraft system of claim 1, wherein the second inlet is fluidly coupled to the first flowpath at a diffuser.

17. The aircraft system of claim 1, further comprising a flow regulator configured to regulate gas flow from the first turbine engine to the second turbine engine through the second inlet.

18. The aircraft system of claim 1, further comprising a flow regulator configured to regulate gas flow from the second turbine engine to the first turbine engine through the second exhaust.

19. An aircraft system, comprising:
a first turbine engine including a first rotating assembly, a first flowpath, a first compressor section, a first combustor section and a first turbine section, the first flowpath extending through the first compressor section, the first combustor section and the first turbine section from a first inlet into the first flowpath to a first exhaust from the first flowpath, and the first combustor section comprising a first combustor;
a second turbine engine including a second rotating assembly, a second flowpath, a second compressor section, a second combustor section and a second turbine section, the second flowpath extending through the second compressor section, the second combustor section and the second turbine section from a second inlet into the second flowpath to a second exhaust from the second flowpath, and the second inlet and the second exhaust each fluidly coupled with the first flowpath upstream of the first combustor; and an electrical system including a clutch, a first electric machine and a second electric machine electrically coupled to the first electric machine, the first electric machine mechanically coupled to the first rotating assembly, and the second electric machine mechanically coupled to the second rotating assembly through the clutch;

wherein the electrical system is configured to draw more electrical power from the first electric machine than the second electric machine when a working fluid temperature is above a threshold.

20. An aircraft system, comprising:

a first turbine engine including a propulsor rotor and an engine core configured to drive rotation of the propulsor rotor, the engine core including a first rotating assembly and a first flowpath;

a second turbine engine including a second rotating assembly and a second flowpath, the second flowpath fluidly coupled with the first flowpath;

an electrical system including a clutch, a first electric machine and a second electric machine electrically coupled to the first electric machine, the first electric machine mechanically coupled to the first rotating assembly, and the second electric machine mechanically coupled to the second rotating assembly through the clutch; and an accessory system including an aircraft component and a gearbox, the gearbox mechanically coupling the aircraft component to the second rotating assembly and the second electric machine;

wherein the electrical system is configured to
draw more electrical power from the second electric machine than the first electric machine when a working fluid temperature is below a first threshold; and
draw more electrical power from the first electric machine than the second electric machine when the working fluid temperature is above a second threshold.

* * * * *